US009429993B2

(12) United States Patent
Thomas et al.

(10) Patent No.: US 9,429,993 B2
(45) Date of Patent: Aug. 30, 2016

(54) COMPUTING DEVICE DOCKING SYSTEMS

(71) Applicant: Toshiba Global Commerce Solutions Holdings Corporation, Tokyo (JP)

(72) Inventors: Jeff D. Thomas, Raleigh, NC (US); Dean F. Herring, Youngsville, NC (US); Brad M. Johnson, Raleigh, NC (US); Robert A. Myers, Cary, NC (US); Danny Addison, Durham, NC (US); Phillip McLamb, Willow Springs, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 159 days.

(21) Appl. No.: 14/176,898

(22) Filed: Feb. 10, 2014

(65) Prior Publication Data

US 2015/0138720 A1    May 21, 2015

Related U.S. Application Data

(60) Provisional application No. 61/907,148, filed on Nov. 21, 2013.

(51) Int. Cl.
*G06F 1/16* (2006.01)

(52) U.S. Cl.
CPC .................................. *G06F 1/1632* (2013.01)

(58) Field of Classification Search
None
See application file for complete search history.

(56) References Cited

U.S. PATENT DOCUMENTS

| | | | | |
|---|---|---|---|---|
| 5,264,992 A | * | 11/1993 | Hogdahl | G06F 1/1626 16/334 |
| 5,450,271 A | * | 9/1995 | Fukushima | G06F 1/1632 248/553 |
| 5,452,180 A | * | 9/1995 | Register | G06F 1/1632 361/679.44 |
| 5,557,562 A | | 9/1996 | Yoshiharu et al. | |
| 5,568,359 A | | 10/1996 | Cavello et al. | |
| 5,687,060 A | | 11/1997 | Ruch et al. | |
| 5,692,400 A | | 12/1997 | Bliven et al. | |
| 5,812,356 A | * | 9/1998 | O'Connor | G06F 1/1632 335/179 |

(Continued)

FOREIGN PATENT DOCUMENTS

| | | |
|---|---|---|
| EP | 2570884 | 3/2013 |
| WO | 2010138072 | 12/2010 |

OTHER PUBLICATIONS

Product Description for iHome iD37GZC 30-Pin iPod/iPhoneliPad Alarm Clock Speaker Dock; last accessed Jul. 19, 2013 at http://www.amazon.com/iHome-iD37GZC-30-Pin-iPhone-Speaker/dp/B004OA6VZ0/ref= . . . ; 5 pages.

*Primary Examiner* — Courtney Smith
*Assistant Examiner* — Rashen E Morrison
(74) *Attorney, Agent, or Firm* — Olive Law Group, PLLC

(57) ABSTRACT

Computing device docking systems are disclosed. According to an aspect, a computing device docking system includes a docking station component having an opening defined within a surface. The system includes a pin including a body and an end having a member extending laterally from the body. The end of the pin is receivable within an opening of a computing device component for attaching the computing device component to the docking station. The pin is moveable within the opening between a first position and a second position. In the first position, at least a portion of the body and at least a portion of the member is positioned within the opening of the docking station component. In the second position, at least a portion of the body is within the opening and the member is outside of the opening of the docking station component.

16 Claims, 6 Drawing Sheets

(56) References Cited

U.S. PATENT DOCUMENTS

| | | | |
|---|---|---|---|
| 5,870,283 A * | 2/1999 | Maeda | G06F 1/1632 361/679.44 |
| 6,047,572 A * | 4/2000 | Bliven | E05B 73/0005 361/679.43 |
| 6,061,234 A * | 5/2000 | Broder | H05K 5/0013 361/679.41 |
| 6,188,572 B1 | 2/2001 | Liao et al. | |
| 6,189,349 B1 * | 2/2001 | Helot | E05B 73/0082 70/57 |
| 6,236,571 B1 * | 5/2001 | Dohi | G06F 1/1632 361/679.45 |
| 6,275,378 B1 * | 8/2001 | Lee | E05B 73/0082 248/553 |
| 6,331,934 B1 | 12/2001 | Helot et al. | |
| 6,549,416 B2 | 4/2003 | Sterner et al. | |
| 6,570,758 B1 | 5/2003 | Maeda | |
| 6,581,420 B1 * | 6/2003 | Ling | E05B 73/0082 248/551 |
| 6,716,058 B2 * | 4/2004 | Youn | G06F 1/1632 439/165 |
| 6,856,506 B2 | 2/2005 | Doherty et al. | |
| 6,912,125 B2 * | 6/2005 | Weng | G06F 1/1632 361/679.41 |
| 6,952,340 B2 | 10/2005 | Son et al. | |
| 7,028,513 B2 * | 4/2006 | Avganim | E05B 73/0082 70/159 |
| 7,079,385 B1 * | 7/2006 | Cheng | G06F 1/1632 248/553 |
| 7,130,188 B2 * | 10/2006 | Lee | H05K 5/0204 361/679.57 |
| 7,298,611 B1 | 11/2007 | Carnevali | |
| 7,471,508 B2 * | 12/2008 | Martin-Otto | E05B 73/0005 361/679.55 |
| 7,633,750 B2 * | 12/2009 | Fan | G06F 1/1632 361/679.41 |
| 7,933,118 B2 * | 4/2011 | Chiu | H05K 5/0247 361/679.4 |
| 8,189,330 B2 * | 5/2012 | Hung | G06F 1/1632 361/679.41 |
| 8,223,483 B2 | 7/2012 | Hayashida et al. | |
| 8,230,707 B2 * | 7/2012 | Hung | E05B 73/0082 248/551 |
| 8,320,961 B2 * | 11/2012 | Raffle | H04M 1/04 248/309.1 |
| 8,477,953 B2 | 7/2013 | Hobson et al. | |
| 2003/0227744 A1 * | 12/2003 | DeLuga | E05B 73/0082 361/679.57 |
| 2004/0145871 A1 * | 7/2004 | Lee | H05K 5/0204 361/732 |
| 2004/0224638 A1 | 11/2004 | Fadell et al. | |
| 2004/0261474 A1 * | 12/2004 | Galant | E05B 73/0082 70/58 |
| 2006/0232926 A1 * | 10/2006 | Homer | G06F 1/1632 361/679.43 |
| 2010/0177476 A1 * | 7/2010 | Hotelling | G06F 1/1632 361/679.41 |
| 2011/0159923 A1 * | 6/2011 | Raffle | H04M 1/04 455/557 |
| 2011/0191864 A1 | 8/2011 | Nagamura et al. | |
| 2012/0212900 A1 | 8/2012 | Hung | |
| 2013/0058065 A1 | 3/2013 | Minaguchi et al. | |
| 2013/0107445 A1 | 5/2013 | Reber et al. | |
| 2015/0163954 A1 * | 6/2015 | Goh | H05K 7/1498 361/679.33 |

* cited by examiner

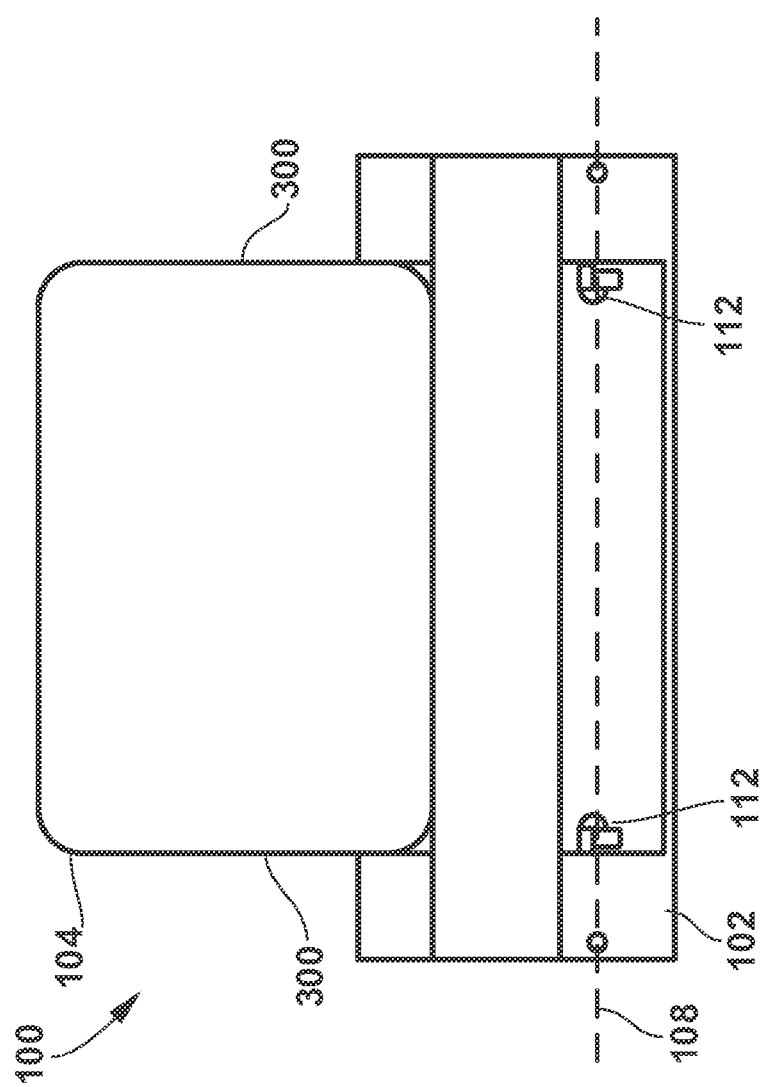
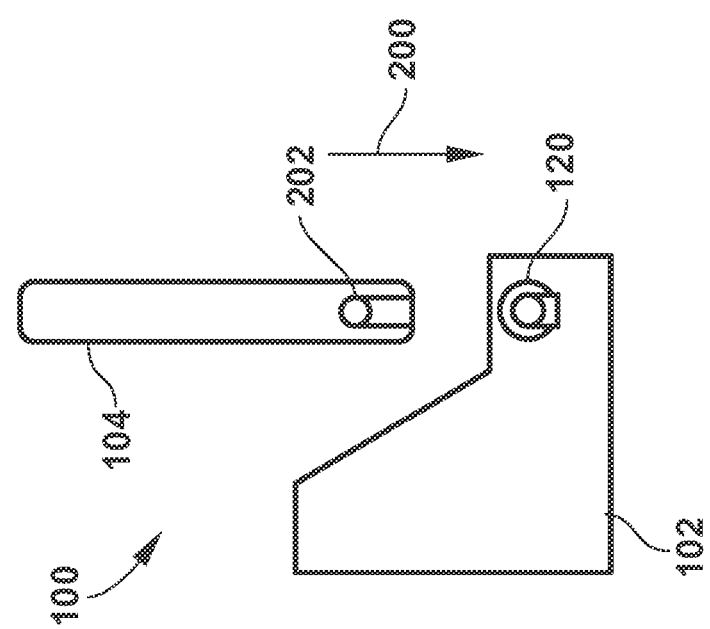
FIG. 3
FIG. 2

COMPUTING DEVICE DOCKING SYSTEMS

CROSS REFERENCE TO RELATED APPLICATION

This application claims the benefit of U.S. Provisional Patent Application No. 61/907,148, filed Nov. 21, 2013 and titled COMPUTING DEVICE DOCKING SYSTEMS, the content of which is hereby incorporated herein by reference in its entirety.

TECHNICAL FIELD

The present invention relates to computing devices, and more specifically, to computing device docking systems.

BACKGROUND

Mobile computing devices, such as tablet computers, laptop computers, and smartphones, are now more commonly used due to their small size, computing power, and portability. Often, such mobile computing devices are paired with a docking station to provide enhanced features and a power supply interface. Many times, the docking station has hooks for engaging corresponding holes defined in the mobile computing device, thus, establishing attachment of the mobile computing device to the docking station. In this position, input/output (I/O) components of the mobile computing devices may interface with corresponding (I/O) components of the docking station.

In some environments, it is desirable to provide increased security when attaching the mobile computing device to the docking station. For example, in retail environments it may be desired to securely dock the mobile computing device to a docking station such that it is difficult for an unauthorized individual to remove the mobile computing device from the docking station. In this way, theft and other unauthorized uses of mobile computing devices may be deterred.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are computing device docking systems. According to an aspect, a computing device docking system includes a docking station component including a surface and an opening defined within the surface. The system also includes a pin including a body and an end having a member extending laterally from the body. The end of the pin is receivable within an opening of a computing device component for attaching the computing device component to the docking station. The pin is moveable within the opening between a first position and a second position. In the first position, at least a portion of the body and at least a portion of the member is positioned within the opening of the docking station component. In the second position, at least a portion of the body is within the opening and the member is outside of the opening of the docking station component. Also, in the second position, the pin is rotatable about an axis between the second position and a third position. In the third position, the member abuts the surface of the docking station component to prevent movement of the pin further into the opening.

According to another aspect, a computing device docking system includes a computing device component including a first surface and a second surface that substantially opposes the first surface, wherein the first and second surfaces define first and second openings, respectively. The system also includes a docking station component including a third surface and a fourth surface. The third and fourth surfaces define third and fourth openings, respectively. When the computing device component is in a docking position with the docking station component, the first opening of the computing device component faces the third opening of the docking station, and the second opening of the computing device component faces the fourth opening of the docking station. The system also includes a first pin including a body and an end having a member extending laterally from the body. The end of the pin is receivable within the first opening of the computing device component. The pin is movable between a first position at least partially within the first and third openings and a second position with the pin at least partially within the first opening and outside of the third opening. Further, the system includes a second pin including a body and an end having a member extending laterally from the body. The end of the pin is receivable within the second opening of the computing device component. The pin is movable between a first position at least partially within the second and fourth openings and a second position with the pin at least partially within the second opening and outside of the fourth opening. In the first positions, at least a portion of the body and at least a portion of the member of the first and second pins are positioned within the third and fourth openings, respectively, of the docking station component. In the second positions, at least a portion of the body of the first and second pins are within the third and fourth openings, respectively, of the docking station component and the members of the first and second pins are outside of the third and fourth openings, respectively, of the docking station component. The first and second pins are rotatable about an axis formed by alignment of the pins between the second position and a third position. In the third position, the first and second members abut the third and fourth surfaces, respectively, of the docking station component to prevent movement of the first and second pins further into the opening for attachment of the computing device component with the docking station component.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIGS. 2 and 3 illustrate a side view and a front view, respectively, of the computing docking system shown in FIG. 1A with the computing device undocked from the docking station in accordance with embodiments of the present invention;

DETAILED DESCRIPTION

Figure 1A:
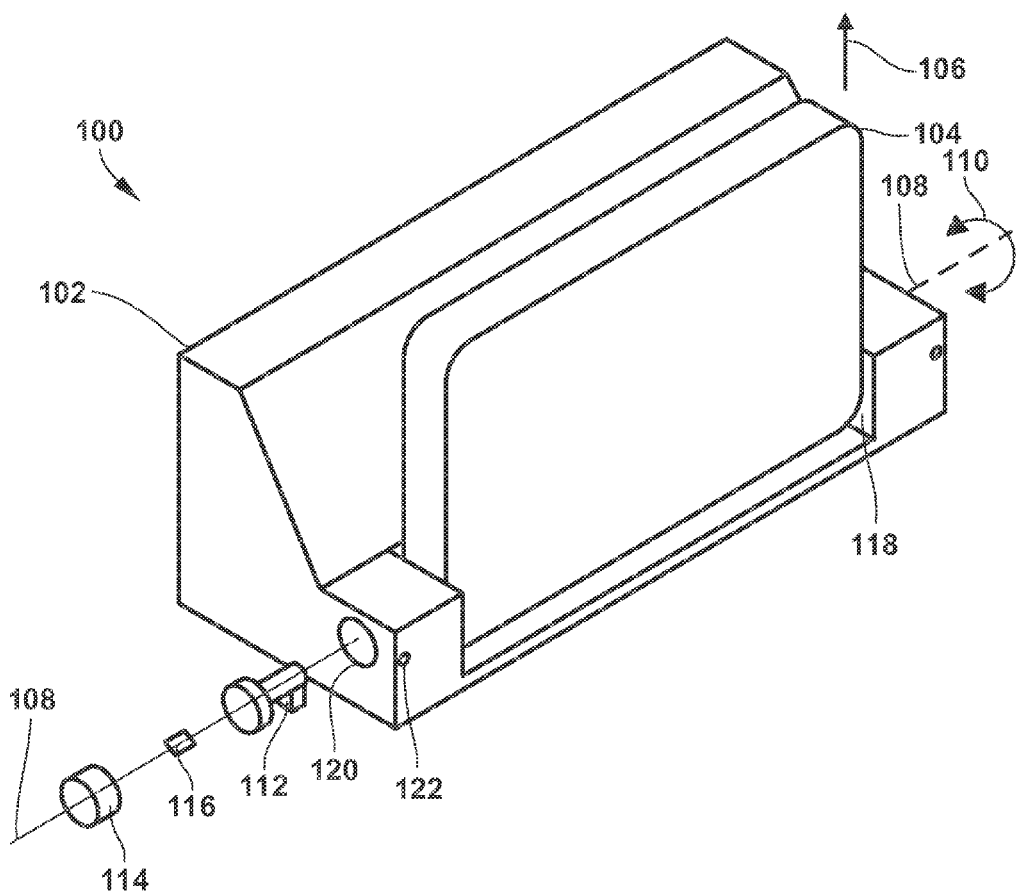
FIG. 1A is a perspective view of an example computing device docking system in accordance with embodiments of the present invention.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, retail equipment such as POS equipment. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

The presently disclosed invention is now described in more detail. For example, FIG. 1A illustrates a perspective view of an example computing device docking system 100 in accordance with embodiments of the present invention. Referring to FIG. 1A, the system 100 includes a docking station 102 and a mobile computing device 104 docked therewith. As shown in FIG. 1A, the computing device 104 may be undocked by pulling the computing device 104 or otherwise exerting a force on the computing device 104 in a direction indicated by direction arrow 106. The computing device 104 is docked by movement in the opposing direction.

As described in further detail herein, the computing device 104 may be rotated about an axis 108 in directions indicated by double direction arrow 110. When docked with the docking station 102 and rotated into positions other than the position shown in FIG. 1A, the computing device is locked into position by pins 112 that engage openings (not shown in FIG. 1A) defined in a surface 114 of a component of the docking station 102. In FIG. 1A, the pin 112 on one side is shown with its corresponding other components, a stop 114 and a spring 116, for holding the pin in place and for biasing the pin 112 in a direction towards the computing device 104. The pin 112, stop 114, and 116 are shown in an exploded view in FIG. 1A to depict arrangement of the components with respect to each other when placed within the docking station 102.

The docking station 102 includes surfaces 118 that substantially oppose each other. The first and second surfaces 118 each define openings 120 within which a respective pin 112, stop 114, and spring 116 are positioned for aligning the pins 112 with the axis 108. The stop 114 may be held in place by a pin (not shown in FIG. 1A) inserted in an opening 122 for attachment to the stop 114. The opening 122 can extend to the opening 120.

In an alternative configuration of the pin 112 and the opening 120, the opening 120 may be shaped as a key slot for receipt of the pin 112 which is shaped to fit within the key slot. The pin 112 may be spring loaded such that the keyed shape of the pin 112 can fit into the computing device 104. The pin 112 may fit into the by spring pressure along a track of the key slot. In this manner, a distal end of the pin 112 may be turned to engage the receptacle opening 120. The computing device 104 may be rotated to turn the key portion of the pin 112 such that the pin cannot retreat back into the slot 120, thus locking the docking station 102 and the computing device 104.

Figure 1B:
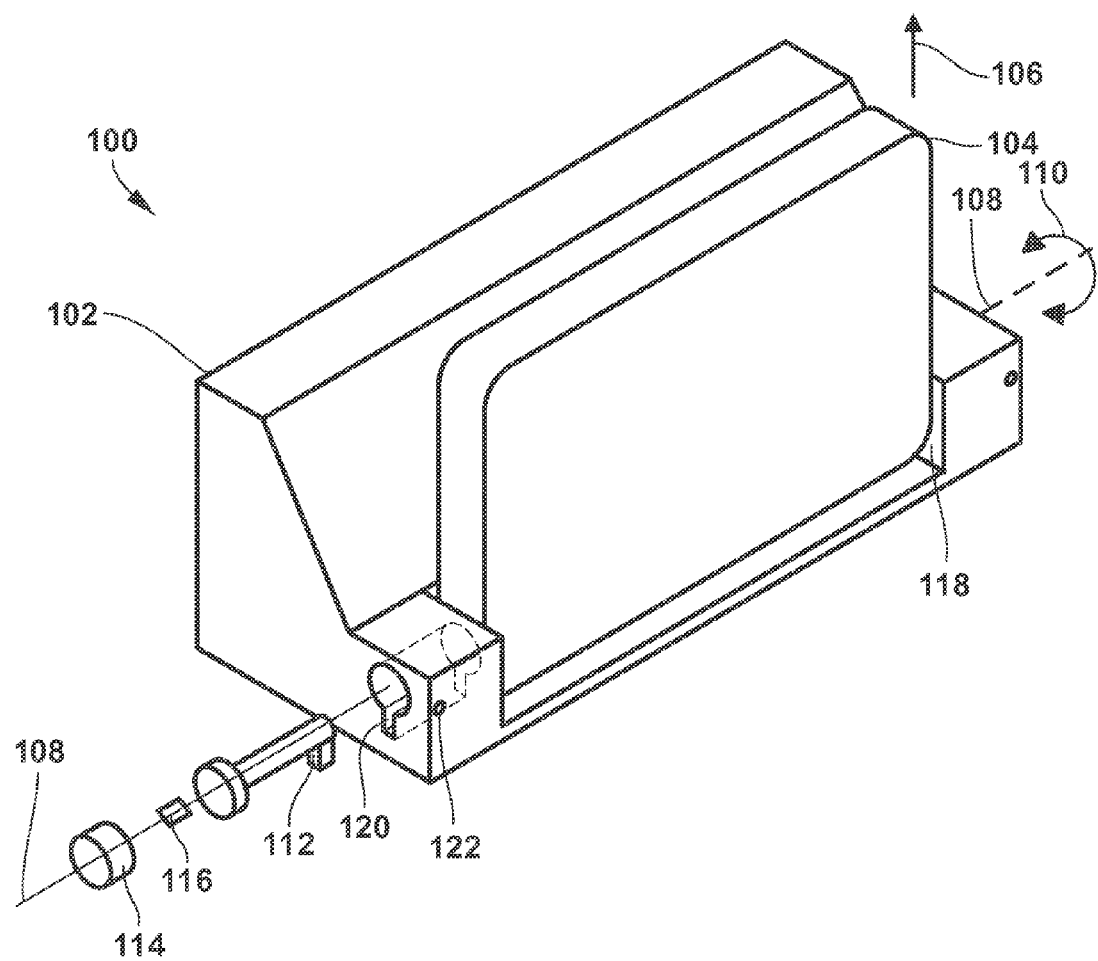
FIG. 1B is a perspective view of another example computing device docking system in accordance with embodiments of the present invention.

In another embodiment, the pin 112 may be key shaped as shown in FIG. 1B, which illustrates a perspective view of another example computing device docking system in accordance with embodiments of the present invention. Referring to FIG. 1B, the opening 120 may be shaped as shown to receive the pin 112. The pin 112 may be spring loaded such that the pin 112 inserts into the corresponding opening of the computing device 104 by spring pressure along a track defined by the key slot of the opening 120. Thus, in this example, when the distal end of the pin 112 is turned via being engaged with the opening in the computing device 104, the key portion of the pin 112 cannot go back into the slot, thus locking computing device 104 with the docking station 102.

Figure 1C:
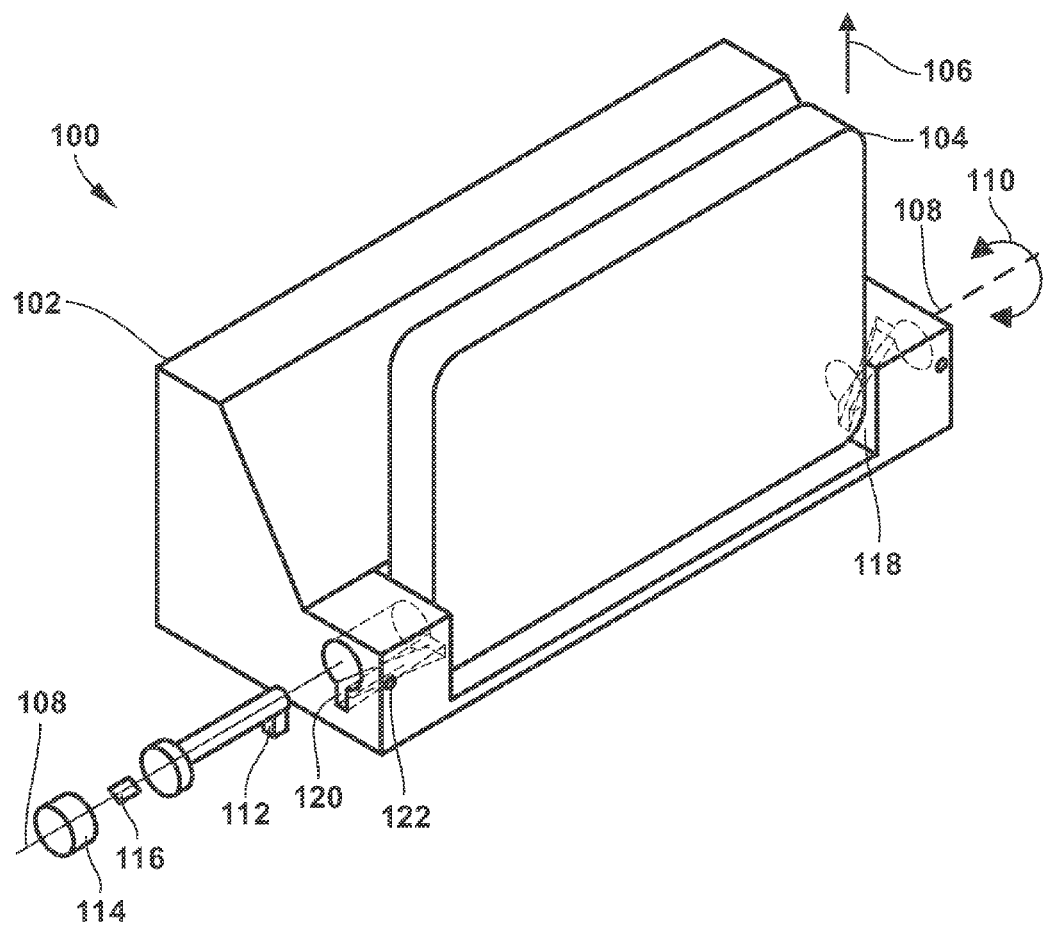
FIG. 1C is a perspective view of another example computing device docking system in accordance with embodiments of the present invention.

FIG. 1C illustrates of a perspective view of another example computing device docking system in accordance with embodiments of the present invention. This example is similar to FIG. 1C except the opening 120 may be formed in the shape of a helix for imparting a spiral movement to the pin 112 as the pin 112 moves further into the opening 120. In this way, the keyed portion of the pin 112 may formed a thread for tightening together the docking station 102 and the computing device 104.

FIGS. 2 and 3 illustrate a side view and a front view, respectively, of the computing docking system 100 shown in FIG. 1A with the computing device 104 undocked from the docking station 102 in accordance with embodiments of the present invention. Referring now to FIG. 2, the computing device 104 may be docked with the docking station 102 by movement of the computing device 104 in the direction indicated by direction arrow 200 until the pins of the docking station 102 engaged corresponding openings 202 of the computing device 104. When the pins engage the openings of the computing device 104, the computing device 104 is in a docking position.

Now referring to FIG. 3, the pins can engage openings defined in respective sides 300 of the computing device 104. The pins 112 are biased by their respective springs to move the pins in a direction within the openings for holding the computing device 104 in the docking position. In the docking position, the computing device 104 may rotate about the axis 108.

Figure 4:
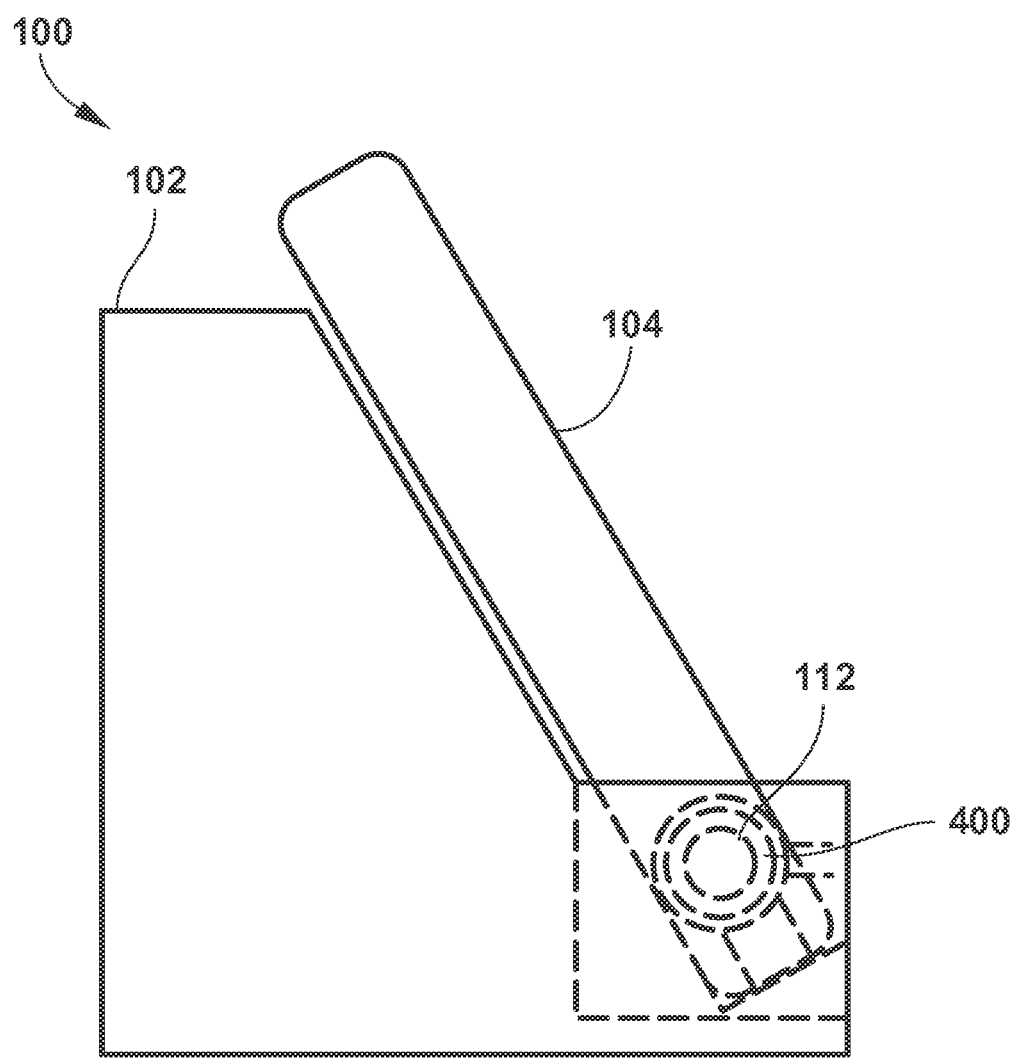
FIG. 4 is a side cross-sectional view of the computing docking system shown in FIGS. 1-3 with the computing device docked with the docking station in accordance with embodiments of the present invention.

FIG. 4 illustrates a side cross-sectional view of the computing docking system 100 shown in FIGS. 1-3 with the computing device 104 docked with the docking station 102 in accordance with embodiments of the present invention. Referring to FIG. 4, the computing device 104 has been rotated to rest against a surface of the 102 in an angled position for use by an operator. The figure also shows a cross-sectional view of an opening 400 of the computing device 104 for engagement with a corresponding pin 112 of the docking station 102.

Figure 5:
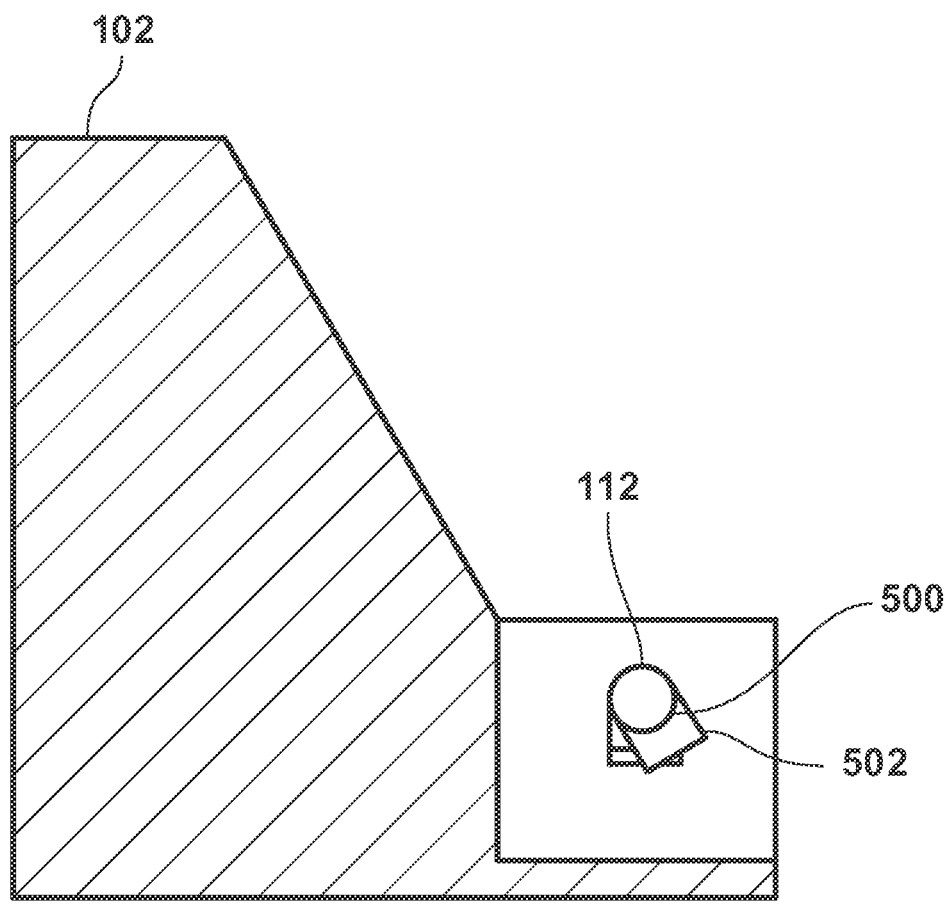
FIG. 5 illustrates a side cross-sectional view of the docking station shown in FIGS. 1A, 2, 3, and 4 in accordance with embodiments of the present invention.

FIG. 5 illustrates a side cross-sectional view of the docking station 102 shown in FIGS. 1A, 2, 3, and 4 in accordance with embodiments of the present invention. Referring to FIG. 5, the pin 112 includes a body 500 having an end with a member 502 that extends laterally from the body 500. The end of the pin 112 is receivable within a corresponding opening of the computing device 104. Further, the pin is movable between a first position at least partially within openings of the docking station 102 and the computing device 104 and a second position with the pin at least partially within the opening of the docking station 104 and outside of the opening of the computing device 102. In this way, the computing device 104 can be attached for docking and released for undocking When the computing device 104 is rotated such that it is not upright as shown in FIG. 1A, the member 502 is caused to rotate due to its engagement with the computing device 104. For example, the position of the member 502 corresponds to its position when the computing device 104 is rotate as shown in FIG. 3. When in this position, the member 502 abuts the corresponding surface of the docking station 102 that defines the corresponding opening. As a result, the pin 112 cannot move further within its opening in the docking station 102 such that the computing device cannot be undocked or removed from the docking station 102. In this case, neither of the pins 112 can move further into their respective openings away from the computing device 104.

To release or undock the computing device 104, the computing device 104 can be moved to the position shown in FIG. 1A and pulled upward in the direction of arrow 106. In the position shown in FIG. 1A, the upward movement of the computing device 104 can cause the pins 112 to move away from the computing device 104. Also, the openings in the docking station 102 are defined such that the members 502 have a pathway for movement into the openings, unlike when the computing device is docked and rotated in positions other than the position shown in FIG. 1A, when the members abut the surfaces of the docking station such that the pins cannot move away from the computing device 104.

In accordance with embodiments of the present invention, the pins 112 may provide an electrical connection for docking of the computing device 104 with the docking station 102. The pins may be entirely or partially made of conductive material (e.g., copper) for connecting electrical components (e.g., I/O and power components) of the docking station 102 and the computing device 104.

In accordance with embodiments of the present invention, the computing device 104 may be rotated in different positions for functioning in either a retail personnel mode or a kiosk (or customer) mode. For example, the computing device 104 may be rotated about the axis 110 into different positions. The computing device 104 may include one or more sensors for detecting its position. When the sensors detect that the computing device 104 is within one position range, the computing device 104 may be configured to operate in the retail personnel mode. When the sensors detect that the computing device 104 is within another position range, the computing device 104 may be configured to operate in the kiosk mode.

In accordance with embodiments of the present invention, the computing device 104 may include a locking mechanism. For example, the mechanism may include a lock-and-key configuration and be suitably integrated with the stop 114, spring 116, and pin 112 assembly shown in FIG. 1A.

In accordance with embodiments of the present invention, the pins 112 and a corresponding openings defined in the sides 300 of the computing device 104 may be configured for tightening the attachment of the computing device 104 to the docking station 102 when the computing device 104 is rotated in different positions. For example, when the computing device 104 is positioned as shown in FIG. 1A, the attachment may be loosest. As the computing device 104 is rotated to the position shown in the FIG. 3, the attachment may become tighter. In one example, the pins 112 may each be threaded, and the openings may have mating threads such that the attachment becomes tighter when the computing device 104 rotates to the position shown in FIG. 3. Further, the threads of the pins 112 and corresponding opening may each have a slot through the threads such that the pins can be inserted into the openings when the computing device 104 is docked.

In accordance with embodiments of the present invention, the system 100 may be configured such that a power saving mode can be entered when the computing device 104 is rotated to a predetermined position or range of positions. For example, when computing device 104 is in position as shown in FIG. 1A or any position rotated forward of this position, the computing device 104 may operate in a power efficient mode. When the computing device 104 is positioned rearward of the position shown in FIG. 1A, the computing device 104 may operate in a normal mode. Further, for example, power efficient mode when in the position shown in FIG. 1A or positions forward of it, the I/O connectors between the computing device 104 and the docking station 102 are connected, but the power connector is not connected such that the battery of the computing device is not being charged for saving power. In the normal mode positions, the I/O connectors and the power connector may be connected between the computing device 104 and the docking station 102 such that the computing device can operate normally.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing device docking system comprising: a docking station component including a surface and an opening defined within the surface; a pin including a body and an end having a member extending laterally from the body, the end of the pin being receivable within an opening of a computing device component for attaching the computing device component to the docking station, the pin being moveable within the opening between a first position and a second position, wherein in the first position, at least a portion of the body and at least a portion of the member is positioned inside the opening of the docking station component, and wherein in the second position: at least a portion of the body is inside the opening and the member is outside of the opening of the docking station component, the pin is rotatable about the axis between the second position and a third position to enable the computing device component to rotate about the axis between the second position and the third position, and wherein in the third position, the member abuts the surface of the docking station component to prevent movement of the pin further into the opening.

2. The computing device docking system of claim 1, wherein the opening of the docking station component is shaped to mate to the end of the pin and the member.

3. The computing device docking system of claim 2, wherein the pin is rotated when the opening of the docking station component is mated to the end of the pin and the member and a torque is applied to the docking station component in alignment with the axis of the pin.

4. The computing device docking system of claim 1, further comprising a biasing member configured to exert a force to the pin for biasing the pin in a direction substantially along the axis of the pin in a direction towards the end of the pin away from the opening.

5. The computing device docking system of claim 4, wherein the biasing member comprises a spring.

6. The computing device docking system of claim 1, wherein the computing device is a tablet computer configured to dock with the docking station.

7. The computing device docking system of claim 1, wherein receipt of the pin inside the opening of the computing device prevents movement of the computing device in a lateral direction with respect to the body of the pin.

8. The computing device docking system of claim 1, wherein the opening of the docking station component defines a shape for movement of the member of the pin between the first and second positions.

9. A computing device docking system comprising: a computing device component including a first surface and a second surface that substantially opposes the first surface, wherein the first and second surfaces define first and second openings, respectively; a docking station component including a third surface and a fourth surface, wherein the third and fourth surfaces define third and fourth openings, respectively, and when the computing device component is in a docking position with the docking station component, the first opening of the computing device component faces the third opening of the docking station, and the second opening of the computing device component faces the fourth opening of the docking station; a first pin including a body and an end having a member extending laterally from the body, the end of the pin being receivable within the first opening of the computing device component, the pin being movable between a first position at least partially inside the first and third openings and a second position with the pin at least partially inside the first opening and outside of the third opening; and a second pin including a body and an end having a member extending laterally from the body, the end of the pin being receivable inside the second opening of the computing device component, and the second pin being movable between a first position at least partially inside the second and fourth openings and a second position with the pin at least partially inside the second opening and outside of the fourth opening, wherein in the first positions, at least a portion of the body and at least a portion of the member of the first and second pins are positioned within inside the third and fourth openings, respectively, of the docking station component, and wherein in the second positions: at least a portion of the body of the first and second pins are inside the third and fourth openings, respectively, of the docking station component and the members of the first and second pins are outside of the third and fourth openings, respectively, of the docking station component, the first and second pins are rotatable about an axis formed by alignment of the pins between the second position and a third position to enable the computing device component to rotate about the axis, and wherein in the third position, the first and second members abut the third and fourth surfaces, respectively, of the docking station component to prevent movement of the first and second pins further into the opening for attachment of the computing device component with the docking station component.

10. The computing device docking system of claim 9, wherein the first opening is shaped to mate to the end and the member of the first pin, and
   wherein the second opening is shaped to mate to the end and the member of the second pin.

11. The computing device docking system of claim 9, wherein the first and second pins are rotated when the first and second openings of the docking station component are mated to the ends and the members of the first and second pins and a torque is applied to the docking station component in alignment with the axis of the pins.

12. The computing device docking system of claim 9, further comprising first and second biasing members configured to exert force to the first and second pins, respectively, for biasing the first and second pins in directions substantially along the axis of the first and second pins in a direction towards the respective ends of the pins away from the first and second openings, respectively.

13. The computing device docking system of claim 12, wherein the biasing members each comprise a spring.

14. The computing device docking system of claim 9, wherein the computing device is a tablet computer configured to dock with the docking station.

15. The computing device docking system of claim 9, wherein receipt of the first and second pins inside the first and second openings, respectively, of the computing device prevents movement of the computing device in a lateral direction with respect to the bodies of the first and second pins.

16. The computing device docking system of claim 9, wherein the third and fourth openings of the docking station component each defines a shape for movement of the respective members of the first and second pins between the respective first and second positions.

* * * * *